May 3, 1966  C. E. BLACK  3,249,367
VEHICLE WHEEL SUPPORTED LADDER
Filed Sept. 11, 1964  2 Sheets-Sheet 1
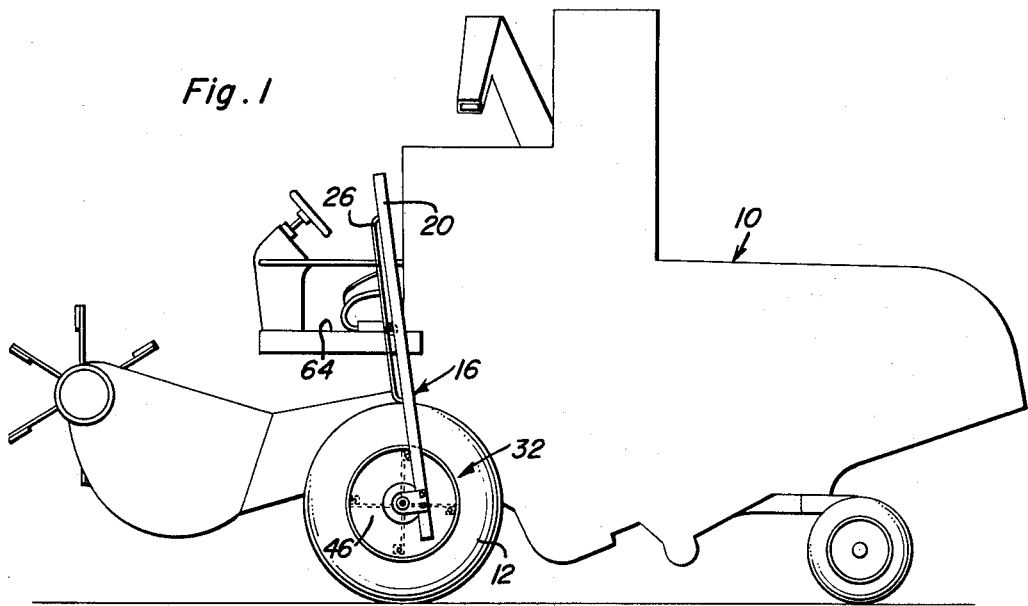
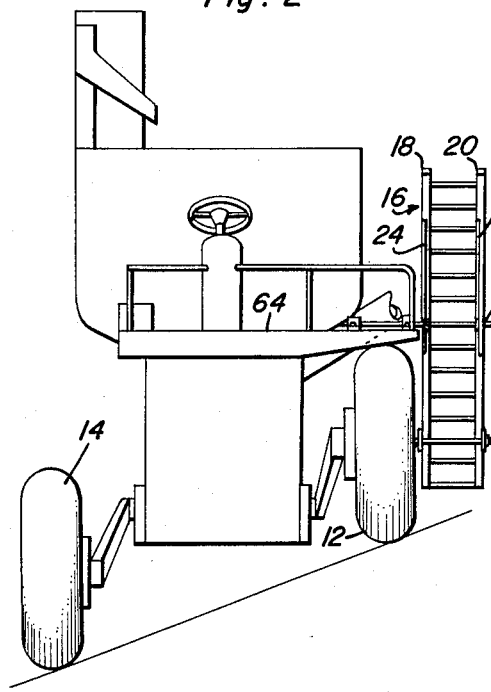
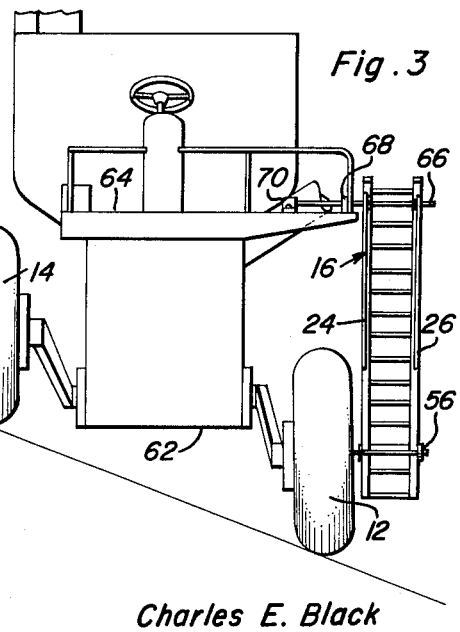
Charles E. Black
INVENTOR.

May 3, 1966   C. E. BLACK   3,249,367
VEHICLE WHEEL SUPPORTED LADDER
Filed Sept. 11, 1964   2 Sheets-Sheet 2
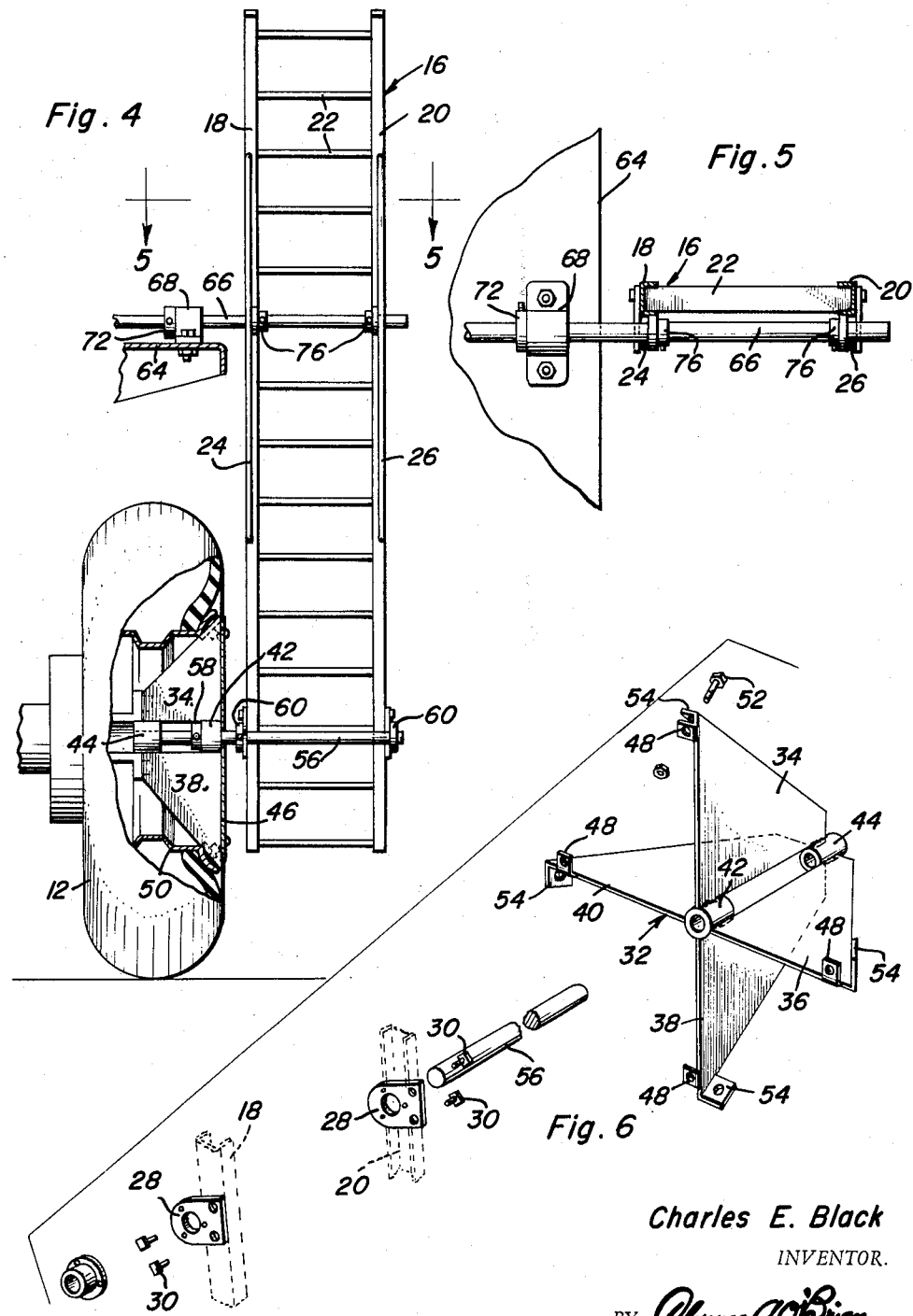
Charles E. Black
INVENTOR.

United States Patent Office 3,249,367
Patented May 3, 1966

3,249,367
VEHICLE WHEEL SUPPORTED LADDER
Charles E. Black, Prescott, Wash.
(P.O. Box 263, Lind, Wash.)
Filed Sept. 11, 1964, Ser. No. 395,780
10 Claims. (Cl. 280—165)

This invention relates to a novel and useful vehicle wheel supported extendable ladder and more specifically to a ladder designed primarily for use on an agricultural vehicle of the type in which the operator's station is on an elevated position above the ground.

Some types of agricultural equipment such as combines include vertically adjustable ground-engaging wheels which enable the combine to be operated on inclined ground while the frame of the combine is maintained substantially horizontally disposed.

These types of combines are presently provided with depending ladders supported from the operator's platform thereof and the lower end of this ladder may be either immediately adjacent the ground, if the ground-engaging wheels on that side of the combine are raised vertically with respect to the operator's platform, or it may be six or seven feet above the ground, if the ground-engaging support wheels on the corresponding side of the combine are lowered relative to the operator's platform of the combine from which the ladder is supported.

It is accordingly the main object of this invention to provide a ladder assembly for a combine of the type including vertically adjustable ground-engaging support wheels having structural features enabling the lower end of the ladder to be spaced closely adjacent and above the ground at all times.

A further object of this invention, in accordance with the immediately preceding object, is to provide a mounting ladder for a combine including means for rotatably supporting the lower end of the ladder from the center of the hub portion of one of the ground-engaging wheels of the combine and means for slidably securing an upper end portion of the ladder to the operator's platform of the combine.

Yet another object of this invention is to provide a mounting ladder in accordance with the preceding objects and constructed in a manner whereby it may be readily adapted for use on substantially all types of combines.

A final object of this invention to be specifically enumerated herein is to provide a boarding ladder in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the occompanying drawings forming a part hereof, wherein like numerals refer to like parts throughout, and in which:

FIGURE 1 is a side elevational view of a conventional form of combine shown with the mounting ladder of the instant invention operatively mounted thereon;

FIGURES 2 and 3 are front elevational views of the combine showing the mounting ladder in different positions of operation as the associated ground-engaging support wheel of the combine is shifted between a raised position relative to the operator's platform to a lowered position relative to the operator's platform;

FIGURE 4 is an enlarged fragmentary front elevational view similar to that of FIGURES 2 and 3 but showing the associated ground-engaging support wheel of the combine in an intermediate position and with portions of the ground-engaging support wheel and operator's platform being broken away and shown in vertical transverse section;

FIGURE 5 is a fragmnetary horizontal sectional view taken substantially upon the plane indicated by the section line 5—5 of FIGURE 4; and FIGURE 6 is an exploded perspective view of the mounting assembly for the lower end of the mouting ladder.

Referring now more specifically to the drawings, the numeral 10 generally designates a conventional form of combine including a pair of vertically adjustable front wheels 12 and 14. The mounting ladder of the instant invention is generally fererred to by the reference numeral 16 and is operatively associated with the ground-engaging support wheel 12.

The mounting ladder 16 is of conventional design for the most part and includes a pair of opposite side rails 18 and 20 interconnected by means of a set of rungs 22. In addition, the mounting ladder 16 also includes a pair of upper guide members 24 and 26 which are each generally U-shaped in configuration and secured to a corresponding side rail of the ladder 16. The U-shaped guide members 24 and 26 define slots extending longitudinally of the mounting ladder 16 and from FIGURES 1, 4 and 6 of the drawings it may be seen that the lower ends of the side rails 18 and 20 each has a journal portion 28 secured thereto in any convenient manner such as by fasteners 30.

A mounting assembly generally referred to by the reference numeral 32 is secured to the wheel 12 and includes a plurality of right angulated plates 34, 36, 38 and 40 interconnecting a pair of axially spaced and aligned sleeves 42 and 44. A cover plate 46 is secured over the outer portion of the mounting assembly 32 by means of suitable fasteners secured through the cover plate 46 and the apertured ears 48 carried by the plates 34, 36, 38 and 40. In addition, each of the plates 34, 36, 38 and 40 is removably secured to the rim 50 of the wheel 12 by means of suitable fasteners 52 secured through the apertured laterally directed flange portions 54 projecting laterally of the plates 34, 36, 38 and 40 adjacent the cover plate 46.

A stub axle 56 is rotatably received through the sleeves 42 and 44 and has a stop collar 58 mounted thereon between the sleeves 42 and 44. Further, the end portion of the stub axle or shaft 56 remote from the collar 58 is rotatably received through the journal portions 28 and secured against axial displacement relative to the journal portions 28 by means of stop collars 60. Accordingly, it may be seen that the lower end of the mounting ladder 16 is rotatably supported from the ground-engaging support wheel 12 for rotation about the axis of rotation of the ground-engaging support wheel 12 relative to the main frame or body portion 62 of the combine 10 from which the operator's platform 64 is supported.

An upper laterally outwardly projecting shaft 66 is supported from the operator's platform 64 in any convenient manner such as by means of a pair of aligned journals 68 and 70 which rotatably receive the shaft 66 therethrough. The shaft 66 has a collar 72 mounted thereon disposed between the journal portions or assemblies 68 and 70 and the outwardly projecting end portion of the shaft 66 is slidably and rotatably received in the slots defined by the U-shaped guide members 24 and 26, there being provided stop collars 76 to prevent axial displacement of the shaft 66 relative to the ladder 16, the stop collars 76 bearing upon the U-shaped guide members 24 and 26.

In operation, the lower end of the mounting ladder 16 is rotatably supported from the hub portion of the ground-engaging support wheel 12 and the axes of rotation of the support wheel 12 relative to the ladder 16 and the main frame 62 coincide. Inasmuch as the upper end of the mounting ladder 16 is slidably supported from the operator's platform 64, it may be seen that an operator of the combine 10 may readily mount the platform 64 with the same degree of ease, excepting for a longer climb, when the ground-engaging support wheel 12 is lowered relative to the main frame 62 as well as when the ground-engaging support wheel 12 is raised relative to the main frame 62. The lower end of the ladder 16 is always substantially the same height above the ground from which the combine 10 is supported and accordingly, the operator of the combine 10 may more readily mount the combine and climb to the operator's platform 64 thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle including a main frame, at least one ground engaging support wheel dependingly journalled from said main frame and supported for vertical adjustment relative to said main frame, an upstanding ladder disposed alongside and outwardly of said one wheel, coacting means carried by said wheel and the lower end portion of said ladder rotatably supporting said ladder from said wheel for rotation of said wheel about an axis relative to said ladder and generally coinciding with the axis of rotation of said wheel relative to said frame, and coacting means carried by said frame and an upper portion of said ladder supporting the upper portion of said ladder from said frame for sliding longitudinal movement of said ladder relative to said frame.

2. The combination of claim 1 wherein the last-mentioned means includes means pivotally supporting said ladder from said frame for movement about an axis generally paralleling the axis of rotation of said one wheel.

3. The combination of claim 1 wherein the first-mentioned coacting means includes a stub axle member supported from and projecting laterally outwardly of said one wheel and generally coinciding with the axis of rotation of said wheel relative to said frame and a pair of axially spaced and aligned journal portions carried by the lower end portion of said ladder and rotatably receiving said stub axle member therein.

4. The combination of claim 1 wherein the second-mentioned coacting means defines a pin and slot connection between said ladder and said frame.

5. The combination of claim 4 wherein the slot of said connection is defined by portions of said ladder and extends longitudinally thereof and the pin of said connection is supported by said frame and generally parallels the axis of rotation of said one wheel.

6. The combination of claim 5 wherein the first-mentioned coacting means includes a stub axle member supported from and projecting laterally outwardly of said one wheel and generally coinciding with the axis of rotation of said wheel relative to said frame and a pair of axially spaced and aligned journal portions carried by the lower end portion of said ladder and rotatably receiving said stub axle member therein.

7. In combination with an upstanding ladder, a generally horizontally disposed and laterally outwardly projecting stub axle member journalled from a lower end portion of said ladder, means carried by the free end portion of said stub axle portion adapted to be secured to a wheel journalled for rotation about a horizontal axis and with said stub axle portion generally coinciding with the axis of rotation of said wheel, and an upper laterally outwardly projecting shaft generally paralleling said stub axle member and rotatably and slidably supported from an upper portion of said ladder for rotation about its longitudinal axis relative to and sliding movement longitudinally along said ladder.

8. The combination of claim 7 wherein said axes generally parallel the medial plane of said ladder.

9. The combination of claim 1 wherein said axis generally parallels the medial plane of said ladder.

10. In combination, a vehicle including a main frame, at least one ground engaging support wheel dependingly journalled from said main frame and supported for vertical adjustment relative to said main frame, an upstanding ladder disposed adjacent said one wheel, coacting means carried by said wheel and the lower end portion of said ladder supporting said ladder from said wheel for vertical adjustment of said ladder with said wheel, and coacting means carried by said frame and an upper portion of said ladder supporting the upper portion of said ladder from said frame for guided longitudinal movement of said ladder relative to said frame.

References Cited by the Examiner

UNITED STATES PATENTS

| | | | |
|---|---|---|---|
| 1,068,890 | 7/1913 | Gohlke | 280—165 X |
| 2,218,060 | 10/1940 | Watson | 280—165 |
| 2,999,556 | 9/1961 | Horne | 280—166 X |
| 3,160,423 | 12/1964 | Boone | 280—165 |

BENJAMIN HERSH, *Primary Examiner.*

W. A. MARCONTELL, *Assistant Examiner.*